June 9, 1964

R. P. CIAGNE 3,136,609

SLIDE PRODUCING MACHINE

Filed July 2, 1959

INVENTOR.
RAYMOND P. CIAGNE
BY *Morin Moody*
ATTORNEY

June 9, 1964

R. P. CIAGNE 3,136,609

SLIDE PRODUCING MACHINE

Filed July 2, 1959

INVENTOR.
RAYMOND P. CIAGNE
BY *MrioMoody*

ATTORNEY

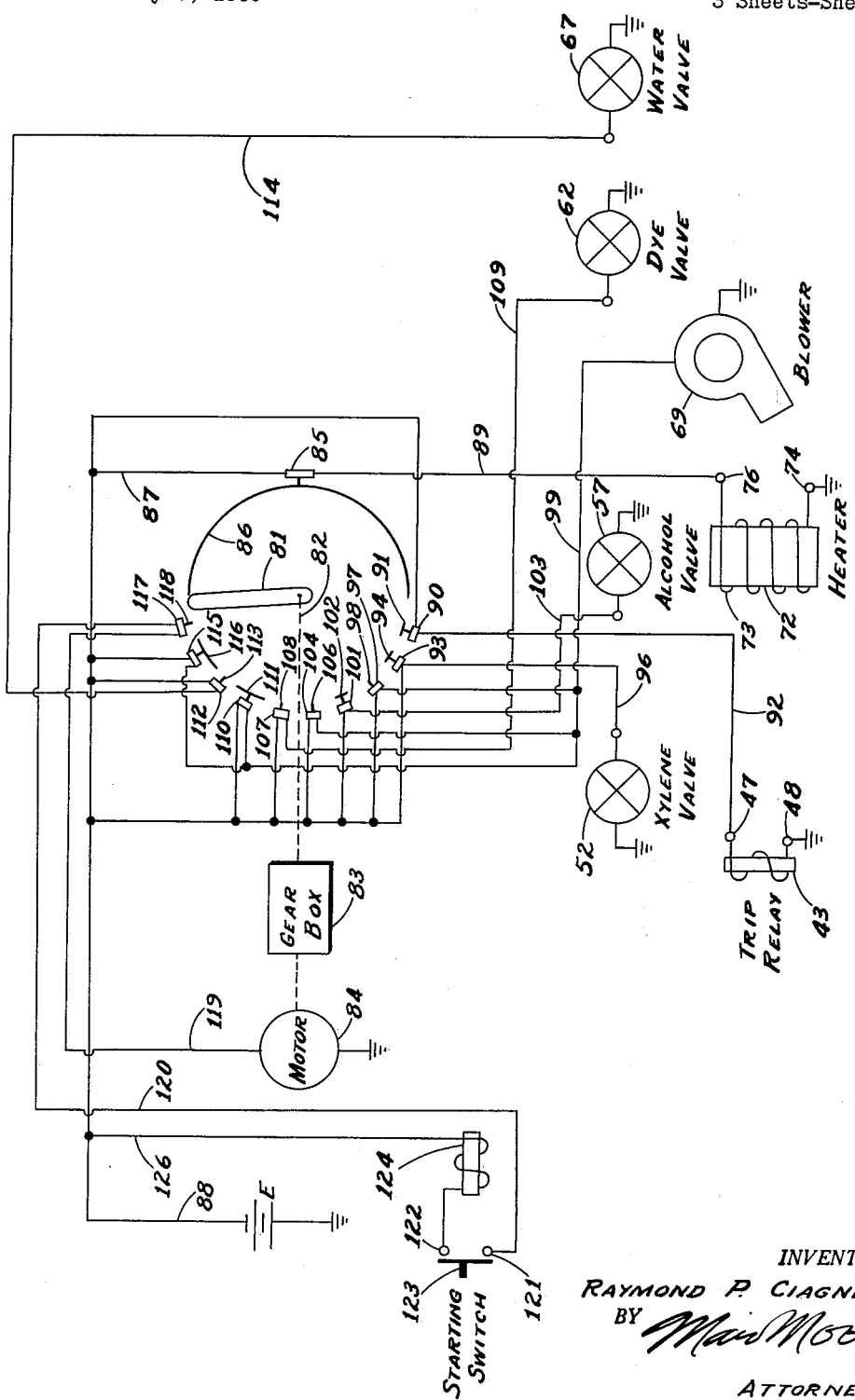

United States Patent Office 3,136,609
Patented June 9, 1964

3,136,609
SLIDE PRODUCING MACHINE
Raymond P. Ciagne, 1440 26th St., Marion, Iowa
Filed July 2, 1959, Ser. No. 824,507
7 Claims. (Cl. 23—267)

This invention relates in general to a testing machine and in particular to apparatus for rapidly and automatically testing milk.

Present day handling of milk is accomplished by having large capacity tank trucks visit the dairies to pick up the milk. Since sanitary conditions at each dairy must be controlled, a sample of each dairy's milk is normally taken in a test tube and placed in a rack on the truck. The test tubes must be marked to identify the milk as coming from a particular dairy. At the receiving station these test tubes are opened and the samples tested to note the bacteria content and other conditions. However, since the pick-up truck may not visit the dairy for a couple of days on another pickup, the dairy operator may not know of unsatisfactory conditions in his milk for a time.

Also, the test requires about thirty minutes of time at the laboratory to run, wherein a laboratory technician would dry, add various chemicals, wash etc. Also since the bacteria will continue to grow until killed, the bacteria count in the milk first picked up by the truck will give a reading out of proportion to the milk last picked up by the truck.

It is an object of this invention therefore, to provide an automatic testing machine which can be carried by the pick-up truck to quickly prepare slides of the milk to prevent a test sample from changing after the time of pickup.

Yet another object is to provide an improved testing machine.

A feature of this invention is found in the provision for an automatic testing machine into which a milk sample may be placed and be automatically prepared for bacteria count.

Further objects, features and advantages will become apparent from the following description and claims, in which:

FIGURE 4 is a schematic view which illustrates the electrical circuitry of the machine.

Figure 1:
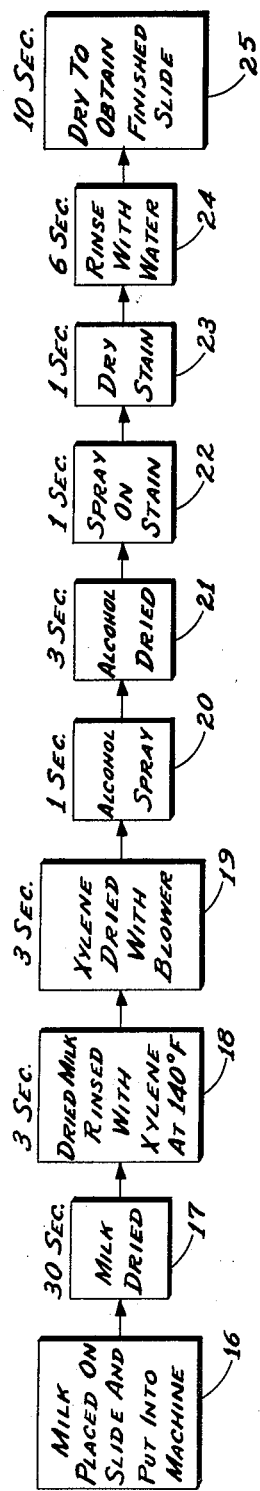
FIGURE 1 illustrates the automatic machine of this invention mounted on a milk pick-up truck.

FIGURE 1 illustrates a truck, designated generally as 10 which has the testing machine 11 of this invention mounted thereon. The machine might be attached to the side of the truck behind the cab. The machine has a protective door 15 supported by hinges 13 and 14 and has a catch 12 to firmly hold the door 15 when the machine is not being used.

When milk is picked up at a dairy, a drop of milk is placed on a glass slide and the door 15 is opened and the slide is placed in the machine. The machine then prepares the slide.

Figure 2:
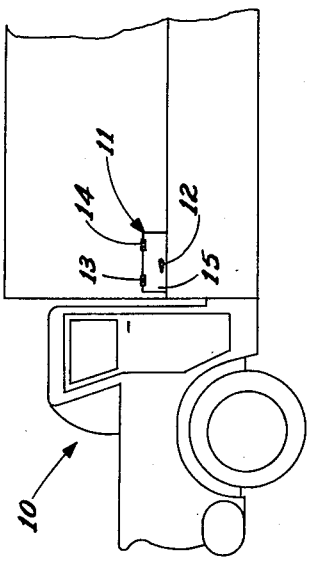
FIGURE 2 is a flow diagram which illustrates the steps carried out by the machine of this invention.

FIGURE 2 illustrates the operations to which the test slide is subjected to prepare the bacteria test. The milk is placed on a slide of conventional type and put into a machine. A starting switch is closed by the operator and the machine then dries the milk on the slide. This takes about thirty seconds with a heater made of nichrome wire, for example. Then, xylene, a liquid chemical, is sprayed over the dried milk on the slide for about three seconds. This breaks down and removes the fat in the milk sample.

Then the xylene is dried with air from a blower for three seconds. Next the sample is sprayed with alcohol under pressure for one second, and the alcohol is dried with the blower for three seconds.

Next a stain is sprayed on the slide under pressure and the stain is dried with a blower.

Then the slide is washed with water for six seconds and the slide is dried for ten seconds to complete it.

Thus, in about one minute the machine of this invention prepares a slide for a bacteria count test wherein if the milk were placed in a test tube and taken to the laboratory, at least thirty minutes of time is required by a laboratory technician to prepare the slide.

Figure 3:
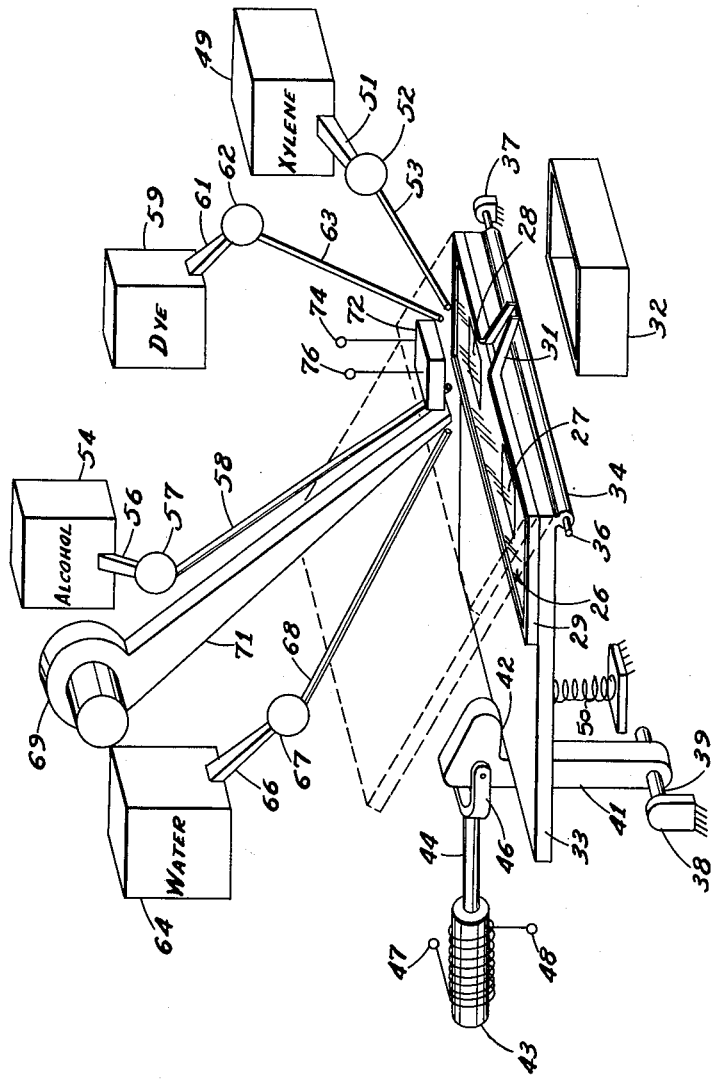
FIGURE 3 illustrates the test slide and certain portions of the machine.

FIGURE 3 illustrates the mechanism of the machine upon which the slide rests.

The glass slide 26 has areas 27 and 28 for receiving milk samples. Milk from one pick-up can be placed on area 28 and milk from a second pick-up can be placed on the area 27. Just enough milk to cover areas 27 and 28 are used in preparing the slide. The slide may be identified by marking it with a pencil. Likewise the areas 27 and 28 may be identified as corresponding to a particular sample by marking by pencil.

The slide is placed in a slide holder 29 which has a recess large enough to receive the slide and a drain spout 31 to allow liquids to drain into a drain pan 32.

The slide holder 29 is attached to a pivot plate 33 which has a hollow portion 34 through which extends an axle 36 which is supported by brackets 37, only one of which is shown.

A bracket 38 carries a shaft 39 which rotatably supports a pawl 41 with a locking lip 42. A relay 43 has an actuating arm 44 which terminates in a yoke 46 that is connected to pawl 41. A winding of relay 43 has terminals 47 and 48.

A spring 50 is mounted between a bearing plate and pivot plate 33 to bias it upwardly to the dotted position shown in FIGURE 3 when the pawl 41 is released.

A first tank 49 contains xylene and has an outlet 51 which connects to an electrically controlled valve 52. A delivery spout 53 delivers xylene to the sample on area 28.

A second tank 54 contains alcohol under pressure and has an outlet 56 that connects to an electrically controlled valve 57 that has a delivery spout 58 for spraying the area 28.

A third tank 59 contains dye under pressure and has an outlet 61 that connects to an electrically controlled valve 62. A delivery spout 63 delivers the dye to area 28.

A water tank 64 has an outlet 66 that connects to an electrically controlled valve 67 which has a delivery spout 68 for delivering water to area 28.

A blower 69 has a delivery spout 71 which directs drying air on area 28.

A heater 72 is mounted above area 28 and has a winding 73 of nichrome wire which becomes hot when energized.

Leads 74 and 76 are connected to the heater winding.

FIGURE 4 illustrates the electrical control circuitry of this invention.

An electrical motor 84 has one side connected to ground and has an output shaft connected to a reduction gear box 83. An output shaft 82 of the gear box is connected to a timing arm 81.

A first switch 85 has a crescent-shaped contact 86 mounted adjacent the timing arm 81. One side of switch 85 is connected to heater contact 76. Heater contact 74 is connected to ground. The other side of switch 85 is connected by lead 87 to one side 88 of a power supply E which has its other side connected to ground.

A second switch 90 has a contact 91 engageable by arm 81. One side of switch 90 is connected by lead 92 to terminal 47 of trip relay 43. The other terminal 48 of this relay is connected to ground. The other side of switch 90 is connected to side 88 of the power supply E.

A third switch 93 has a contact 94 engageable by arm 81 and has one side connected by lead 96 to one side of xylene valve 52. The other side of the xylene valve is connected to ground. The other side of switch 93 is connected to side 88 of the power supply.

A fourth switch 97 has a contact 98 engageable by arm 81 and has one side connected to one terminal of the blower 69 and the other side to the power supply. The other terminal of the blower is connected to ground. A fifth switch 101 has a contact 102 engageable by arm 81 and has one side connected to one terminal of the alcohol valve 57 and the other side to the power supply. The second terminal of the alcohol valve is connected to ground.

A sixth switch 104 has a contact 106 engageable by arm 81 and has one side connected to the power supply and the other side to one terminal of the blower 69. A seventh switch 107 has a contact 108 engageable by arm 81 and has one side connected to the power supply and the other side to one terminal of dye valve 62. The other side of the dye valve is connected to ground.

An eighth switch 110 has a contact 111 engageable by arm 81 and has one side connected to the power supply and the other side to the blower 69. A ninth switch 112 has a contact 113 engageable by arm 81 and has one side connected to the power supply and the other side to one side of water valve 67. The other side of the water valve 67 is connected to ground. A tenth switch 115 has a contact 116 engageable by arm 81 and has one side connected to the power supply and the other side to blower 69.

An eleventh switch 117 has a contact 118 that is engageable by arm 81 and has one side connected to one terminal of motor 84 by lead 119. The other terminal of motor 84 is connected to ground. The other side of switch 117 is connected to terminal 121 of a starting switch by lead 120. A push button 123 of the starting switch is engageable with terminals 121 and 122. Terminal 122 is connected to holding relay 124 which is connected by lead 126 to the power supply.

In operation, the driver of the milk truck will park his truck at the farmer's dairy and will open the lid 15 of the slide preparing machine. He will at this time press plate 33 downwardly against spring 50 to allow latch 42 of pawl 41 to hold it in the level position.

Then a slide will be identified for later reference and a milk sample will be placed on area 28.

Then the slide will be placed in slide holder 29 with the area 28 under the active portion of the testing machine and the push button 123 will be pushed to engage terminals 121 and 122. This closes the circuit to motor 84 because switch 117 is normally a closed switch and opens only when contact 118 is engaged by arm 81. The holding relay 124 is in series with the motor circuit and holds the push button 123 against contacts 121 and 122 until arm 81 opens switch 117. This allows the push button to be pushed in by the driver and he may then remove his finger from the button.

Arm 81 is driven clockwise relative to FIGURE 4 by the motor and engages contact 86 to close switch 85 which turns on heater 72. Since as shown in FIGURE 2 about half of the entire cycle is required to dry the milk, contact 86 extends about half way about the periphery of arm 81. After arm disengages contact 86 it passes to contact 91 to energize relay 43 to release latch 42 and allow spring 50 to place table 33 in the tilted position shown by dotted line in FIGURE 3. Next the arm 81 closes switch 93 which sprays xylene on the sample. Then the arm closes switch 97 to turn on blower 69. Next switch 101 is turned on to close the alcohol valve 57 and then the blower is turned on again by switch 104.

Arm 81 then closes switch 107 to operate dye valve 62 and then blower 69 is turned on again by switch 110.

Arm 81 then closes switch 112 of water valve 67. Arm 81 next closes switch 115 to operate blower for the last time in the cycle. Arm 81 then engages contact 118 of switch 117 to open it. This interrupts current to motor 84 and stops it. The hold relay 124 also releases push button 123 so that it returns to the open position.

The arm 81 coasts past contact 118 and stops between contacts 118 and 86 until the push button 123 is pushed to start the cycle again.

The operator removes the slide 26 from the machine and stores it until he reaches the laboratory where they may be read and recorded. He pushes plate down under latch 42 so it will be ready for the next slide.

Two samples may be placed on each slide if desired.

It is seen that this invention provides an automatic machine for rapidly and automatically preparing slides.

Although this invention has been described with respect to preferred embodiments, changes and modifications may be made which are within the full intended scope of this invention as defined by the appended claims.

I claim:

1. Apparatus for automatically preparing a test slide comprising, a slide holder for receiving a slide with a sample thereon, drying means mounted adjacent the slide holder for drying the sample, a first tank with a controllable outlet which discharges on the slide, a second tank with a controllable outlet which discharges on the slide, a third tank with a controllable outlet which discharges on the slide, a fourth tank with a controllable outlet which discharges on the slide, a heater adjacent the slide, a blower mounted adjacent the slide holder for directing air on the slide, and a master timer mechanism connected to the controllable outlets of the four tanks, the heater and the blower to control them in sequence to prepare a sample slide.

2. In apparatus according to claim 1 said slide holder pivotally supported for rotation about a horizontal axis, a latch connected to the slide holder to hold it in a horizontal position when engaged, a spring biasing means connected to the slide holder to move it upwardly when the latch is released, a relay connected to the latch, and the master timer connected to the relay to release the latch after the sample has been dried.

3. Apparatus for preparing slides comprising a slide holder supported for pivotal motion from a first horizontal to a second inclined position, means for holding said slide holder in one of said positions, means for biasing said holder to the other position, four tanks with electrically controllable outlets mounted adjacent the slide holder and with outlets adjacent the slide holder, a heater adjacent the slide holder, a blower adjacent the slide holder, and a master timer connected to the means for holding the heater, the blower and the controllable outlets of the four tanks to sequentially operate them so as to prepare a slide.

4. In apparatus according to claim 3 wherein the master timer includes a motor, a starting switch connected to the motor, a wiper arm connected to the motor, and a plurality of switch contacts engageable by the wiper arm respectively connected to the means for holding, the heater, the blower, the controllable outlets for the four tanks and the starting switch.

5. Apparatus for preparing slides for milk testing comprising, a slide holder for receiving a test slide with a milk sample thereon, a heater for drying the milk, a xylene container with a controllable discharge for delivering xylene on the milk sample, a blower for drying the slide sample, an alcohol container with a controllable discharge for delivering alcohol on the milk sample, a dye container with a controllable discharge for delivering dye on the milk sample, a water container with a controllable discharge for delivering water on the milk sample, and a master timer connected to the heater, the blower and the controllable discharge of the xylene, alcohol, dye and water containers to control their discharge.

6. In apparatus according to claim 5 wherein the master timer comprises a motor, a motor start circuit connected to the motor, a power supply connected to the motor start circuit, a wiper arm connected to the motor, eleven switches mounted about the wiper arm and with their contacts engageable therewith, one side of ten of the switches connected to the power supply, the other side of the first switch connected to the heater, a trip mechanism for moving the slide holder from a first to a second position, the other side of the second switch connected to the trip mechanism, the other side of the third switch connected to the controllable outlet of the xylene container, the other sides of the fourth, sixth, eighth and tenth switches connected to the blower, the other side of the fifth switch connected to the controllable outlet of the alcohol container, the seventh switch connected to the controllable outlet of the dye container, the other side of the ninth switch connected to the controllable outlet of the water container, and one side of the eleventh switch connected to the motor, the second side of the eleventh switch connected to the motor start switch, and said eleventh switch normally closed but opened when engaged by the arm.

7. Apparatus for preparing a milk slide comprising, a slide holder, means for drying a sample of milk on the slide holder, means for applying four different fluids in sequence to the slide holder, a blower for drying the slide sample, and a master timer connected to the means for drying, means for applying, and the blower to properly control them.

References Cited in the file of this patent
UNITED STATES PATENTS

| | | |
|---|---|---|
| 1,391,965 | Mojonnier | Sept. 27, 1921 |
| 2,046,566 | Lucas | July 7, 1936 |
| 2,264,445 | Losee | Dec. 2, 1941 |
| 2,609,275 | Golding | Sept. 2, 1952 |
| 2,845,043 | O'Callaghan | July 29, 1958 |